US005626101A

United States Patent [19]
Kuhl

[11] Patent Number: 5,626,101
[45] Date of Patent: May 6, 1997

[54] APPARATUS FOR CONTINUOUS HIGH SPEED LOADING OF CHICKS INTO HANDLING TRAYS

[76] Inventor: Jeffrey B. Kuhl, P.O. Box 26, Kuhl Rd., Flemington, N.J. 08822-0026

[21] Appl. No.: 547,097

[22] Filed: Oct. 23, 1995

[51] Int. Cl.$^6$ ............................................. A01K 29/00
[52] U.S. Cl. .................................................. 119/845
[58] Field of Search ............................... 119/845, 844, 119/846

[56] References Cited

U.S. PATENT DOCUMENTS

| Re. 28,708 | 2/1976 | Reynolds | 119/844 |
|---|---|---|---|
| 2,840,041 | 6/1958 | Fleming. | |
| 3,103,915 | 9/1963 | Crain et al.. | |
| 3,110,388 | 11/1963 | Elliott et al.. | |
| 3,346,085 | 10/1967 | Petrich. | |
| 3,568,643 | 3/1971 | Wessinger | 119/844 |
| 4,008,690 | 2/1977 | van Huis | 119/845 |
| 4,112,872 | 9/1978 | van Huis | 119/455 |
| 4,365,591 | 12/1982 | Wills et al. | 119/845 |
| 4,380,969 | 4/1983 | Thomas | 119/845 |
| 4,480,588 | 11/1984 | Holladay et al. | 119/455 |
| 4,510,886 | 4/1985 | van Mil | 119/843 |
| 4,569,308 | 2/1986 | O'Neill et al. | 119/845 |
| 4,669,423 | 6/1987 | van den Brink | 119/846 |
| 4,765,278 | 8/1988 | Boertien | 119/844 |
| 4,925,002 | 5/1990 | Williams | 198/445 |
| 5,101,767 | 4/1992 | Williams et al. | 119/845 |
| 5,325,820 | 7/1994 | Briggs et al. | 119/843 |

Primary Examiner—Robert P. Swiatek
Assistant Examiner—Yvonne R. Abbott
Attorney, Agent, or Firm—Sperry, Zoda & Kane

[57] ABSTRACT

An apparatus for continuous high speed loading of chicks into handling trays positioned therebelow which includes two conveyors positioned above one another. The upper conveyor carries chicks thereon divided into a plurality of rows such as three or four rows and the lower conveyor carries trays adapted to receive a given number of chicks within each tray such as one hundred count per tray. The lower conveyor periodically advances each tray one station to move through a first and second loading station located immediately beneath the end of the continuously moving chick supply conveyor. A deflector assembly is positioned adjacent the output end of the chick conveyor which includes a plurality of diverters each associated with one of the rows of chicks being carried upon the chick conveyor for guiding thereof into the handling tray therebelow positioned in either the first or second tray loading position. A counter is included for determining the number of chicks being loaded. The controller is operative to move the individual diverters sequentially between two diverter positions with one position allowing the chicks to be loaded in the tray in the first tray position and the second diverter positioned allowing chicks to be loaded in the tray located in the second tray position. Full operative control of the diverter position based upon the information received from the counters is supplied to the controller for monitoring operation of the system.

20 Claims, 3 Drawing Sheets

APPARATUS FOR CONTINUOUS HIGH SPEED LOADING OF CHICKS INTO HANDLING TRAYS

BACKGROUND OF THE INVENTION

1. Field of the Invention

The present invention deals with the field of devices for moving of live chicks traveling upon a conveyor into handling trays, otherwise known as boxes or baskets. These trays are supplied empty to a loading station and chicks are supplied continuously on a conveyor and are designed to be loaded into the handling trays to facilitate further handling of the chicks as desired in processing. Numerous devices have been designed over the years for automated loading of live chicks into the handling trays and the present invention provides a unique and improved apparatus thereover.

2. Description of the Prior Art

Numerous prior art designs have been utilized for handling of chicks or poultry for processing thereof such as shown in U.S. Pat. No. 2,840,041 patented Jun. 24, 1958 to C. V. Fleming on a "Conveyor For Poultry"; and U.S. Pat. No. 3,103,915 patented Sept. 17, 1963 to R. I. Crain et al and assigned to Roy I. Crain & Associates, Inc. on a "Poultry Loading Device"; and U.S. Pat. No. 3,110,388 patented Nov. 12, 1963 to G. Elliott et al on a "Live Poultry Conveyor And Counter"; and U.S. Pat. No. 3,346,085 patented Oct. 10, 1967 to B. E. Petrich on a "Concrete Deflector"; and U.S. Pat. No. 3,568,643 patented Mar. 9, 1971 to L. H. Wessinger on a "Poultry-Handling System"; and U.S. Pat. No. Re.28,708 reissued Feb. 10, 1976 to F. N. Reynolds and assigned to Poultry Transaire Systems, Inc. on a "Poultry Loading Apparatus And Method"; and U.S. Pat. No. 4,008,690 patented Feb. 22, 1977 to R. L. van Huis and assigned to U.S. Industries, Inc. on a "Poultry Cage System With Poultry Removal"; and U.S. Pat. No. 4,112,872 patented Sep. 12, 1978 to R. L. Van Huis and assigned to U.S. Industries, Inc. on a "Poultry Cage System With Poultry Removal"; and U.S. Pat. No. 4,365,591 patented Dec. 28, 1982 to D. R. Wills et al and assigned to Anglia Autoflow Limited on a "Livestock Handling System And Apparatus Therefor"; and U.S. Pat. No. 4,380,969 patented Apr. 26, 1983 to D. E. Thomas on an "Apparatus For Unloading Poultry"; and U.S. Pat. No. 4,480,588 patented Nov. 6, 1984 to J. H. Holladay et al and assigned to Cumberland Corporation on an "Apparatus For Raising Poultry Utilizing High Density Brooding"; and U.S. Pat. No. 4,510,886 patented Apr. 16, 1985 to M. P. G. van Mil and assigned to Stork PMT B. V. on a "Device For Emptying A Container Filled With Live Poultry"; and U.S. Pat. No. 4,569,308 patented Feb. 11, 1986 to J. O'Neill et al and assigned to Tamnaharry Developments Limited on a "Collecting Apparatus Primarily For Catching And Elevating For Example Live Birds In A Deep Litter Or Open House Situation"; and U.S. Pat. No. 4,669,423 patented Jun. 2, 1987 to H. G. van den Brink on a "Device For Packing Poultry In Boxes Or Containers"; and U.S. Pat. No. 4,765,278 patented Aug. 23, 1988 to J. Boertien and assigned to Technisch Bureau Boertien on a "Catching Apparatus For Poultry, In Particular For Chicks".

SUMMARY OF THE INVENTION

The present invention provides an apparatus for continuous high speed loading of chicks into handling trays which includes a chick conveyor adapted to transport chicks thereon continuously. This chick conveyor preferably includes an input end and an output end. The chicks are added to the conveyor at any point between the input end and the output end thereof and the chicks are adapted to exit from the chick conveyor adjacent the output end such as to be moved into handling trays positioned therebelow.

A divider apparatus is preferably positioned upon the chick conveyor and includes a plurality of divider walls to separate chicks being transported thereon into a plurality of rows thereof, normally three or four in number.

A tray conveyor is preferably positioned below the chick conveyor and is movable preferably in the same direction and is designed to transport handling trays with open tops to a location approximately below the output end of the chick conveyor to receive chicks exiting therefrom. The tray conveyor preferably defines a first tray position and a second tray position thereon. The tray conveyor means is adapted to sequentially move each handling tray forwardly one station, initially to the first tray position for initial filling thereof and thereafter to move the handling tray to the second tray position to allow continuous filling thereof up to full capacity and to finally remove the handling tray from the loading station and exiting therefrom.

A chick counter device such as a photoelectric cell or other similar device may be positioned adjacent the chick conveyor in order to count the number of chicks passing therealong into a given tray in either the first or second tray positions on the tray conveyor.

A diverter assembly is preferably positioned adjacent the output end of the chick conveyor to control the movement of chicks from the chick conveyor into the handling trays positioned on the tray conveyor therebelow at both the first and second tray positions. This diverter assembly preferably includes a plurality of diverter members preferably being three or four in number which are positioned adjacent the output end of the chick conveyor for controlling movement of chicks exiting therefrom. Each of the diverter members is positioned adjacent one of the three or four rows of chicks exiting from the chick conveyor in order to facilitate control of movement thereof into the handling trays therebelow. Each of the diverter members is selectively pivotally movable to a closed diverter position extending generally downwardly for deflecting chicks exiting the chick conveyor from the associated row of chicks into the handling tray positioned on the tray conveyor at the first tray position therebelow.

Similarly each of the diverter members is selectively pivotally movable to an opened diverter position extending downwardly and outwardly away from the chick conveyor for deflecting chicks exiting from the specifically associated row of chicks into a handling tray positioned on the tray conveyor at the second tray position therebelow.

A controller is included operatively secured to the diverter assembly for controlling pivotal movement of the diverter members between the open and closed position thereof and being operatively secured to the chick counter to determine the number of chicks having been loaded into each handling tray on the tray conveyor. This controller is preferably operatively secured with respect to the tray conveyor to cause sequential movement of each handling tray carried thereon to the first tray position, the second tray position and thereafter for exiting. The controller is responsive to sequentially move the diverter members one at a time from the open position to the closed position responsive to filling of the handling tray to increasingly larger percentages of full capacity thereof. The controller is responsive to the handling tray located in the second tray position being filled with chicks to full capacity to move all of the diverter members to the closed diverter position for the loading of chicks into the handling tray located in the first tray position. The controller is responsive to movement of all of the diverter members to the closed diverter position in order to cause the tray conveyor to allow movement of the filled handling tray from the second tray position and to move the handling tray being filled from the first tray position to the second tray position and to move an empty handling tray into the first tray position. This controller is responsive to initiate movement of a partially filled handling tray from the first tray position to the second tray position in order to initiate movement of all of the diverter members from the closed diverter position to the open diverter position. This controller is operative to move the diverter members from the closed diverter position to the open diverter position simultaneously with movement of a handling tray being filled from the first tray position to the second tray position in order to allow continuous filling thereof with chicks during movement thereof resulting from selective operation of the tray conveyor means. In this manner the diverters will "follow" the movement of the tray being filled from the first tray position to the second tray position and will continue filling thereof during actual movement thus resulting in "continuous filling" thereof. The controller is also responsive to sequentially move the diverter members from the open position to the closed position responsive to filling of the handling tray positioned at the second tray position to a given percentage of full capacity thereof.

In the preferred configuration of the design of the present invention the diverter assembly means will include a first diverter member positioned adjacent the output end of the chick conveyor adjacent the first row of chicks for controlling movement of chicks therein downwardly into the handling trays positioned at the first tray position and the second tray position of the tray conveyor therebelow. This first row of chicks and the first diverter member will be positioned on one lateral side of the chick conveyor preferably.

Similarly a second diverter member will be preferably positioned adjacent the output end of the chick conveyor adjacent the second row of chicks for controlling movement of chicks therein downwardly into the handling trays positioned at the first tray position and the second tray position of the tray conveyor therebelow. This second row of chicks and the second diverter member will be positioned on the opposite lateral side of the chick conveyor from the first row of chicks and the first diverter member in the preferred configuration.

A third diverter member will preferably be positioned adjacent the output end of the chick conveyor adjacent the third row of chicks for controlling movement of chicks therein downwardly into handling trays on the tray conveyor therebelow. This third row of chicks and the third diverter member will preferably be positioned laterally at some point between the first row of chicks and the second row of chicks on the chick conveyor.

A fourth diverter will also be positioned adjacent the output end of the chick conveyor adjacent the fourth row of chicks for controlling movement of the chicks therein downwardly into handling trays positioned at the first tray position and the second tray position on the tray conveyor. This fourth row of chicks and the fourth diverter member will preferably be positioned laterally between the first row of chicks and the second row of chicks on the chick conveyor at a position adjacent the third chick row.

In the preferred configuration the controller will be operative to urge movement of the first diverter member from the open diverter position to the closed diverter position responsive to the loading of chicks into the tray located at the second tray position reaching 90% of full capacity thereof. The controller is also operative to urge movement of the second diverter member from the open diverter position thereof to the closed diverter position responsive to the loading of chicks in the tray located at the second tray position reaching 95% of full capacity thereof.

The controller means is also preferably operative to urge movement of the third diverter member from the open diverter position to the closed diverter position responsive to the loading of chicks into the tray located at the second tray position reaching 98% of full capacity thereof. The controller means is operative finally to urge movement of the fourth diverter member from the open diverter position to the closed diverter position responsive to the loading of chicks into the tray located at the second tray position reaching 100% of full capacity thereof. Also, the controller preferably includes a pneumatic means operatively secured with respect to each of the diverter members for selectively controlling pivoting thereof between the open position and the closed position.

It is an object of the present invention to provide an apparatus for continuous high speed loading of chicks into handling trays wherein the chick feed conveyor is continuously operable to continuously feed chicks into handling trays positioned therebelow.

It is an object of the present invention to provide an apparatus for continuous high speed loading of chicks into handling trays wherein handling trays positioned below the chick conveyor can be filled continuously whether moving or stationary.

It is an object of the present invention to provide an apparatus for continuous high speed loading of chicks into handling trays wherein high speed loading of chicks into handling trays can be achieved with loading capacities as great as 60,000 to 120,000 chicks per hour or even greater.

It is an object of the present invention to provide an apparatus for continuous high speed loading of chicks into handling trays wherein accurate counting of chicks is achieved and the 100% load within a handling tray can be set to between 50 and 150 count per tray.

It is an object of the present invention to provide an apparatus for continuous high speed loading of chicks into handling trays wherein the loading capacity of the handling trays is usually 100 count.

It is an object of the present invention to provide an apparatus for continuous high speed loading of chicks into handling trays wherein the rate of loading within a given tray is gradually decreased as the tray approaches 100% capacity by preferably halting filling thereof one at a time of each row of chicks on the chick supplying conveyor.

It is an object of the present invention to provide an apparatus for continuous high speed loading of chicks into handling trays wherein diverter members are movable between an open position to supply chicks to a first tray position and a closed position to supply chicks to a tray in a second tray position.

It is an object of the present invention to provide an apparatus for continuous high speed loading of chicks into handling trays wherein when used with four rows of chicks being supplied on the chick conveyor the four individual diverters will progressively close once the tray at the second tray position reaches 90% filled and a second diverter will close once the tray reaches 95% filled and a third diverter will move to the closed position once the 98% capacity is reached and the fourth and last diverter will close once the 100% capacity count number is reached thereby accurately and carefully controlling loading of each individual tray and maintaining continuous loading of trays.

It is an object of the present invention to provide an apparatus for continuous high speed loading of chicks into handling trays wherein two different loading stations are provided for holding trays to maintain continuous loading of the trays with the trays being periodically movable by a tray conveyor in order to receive chicks from a continuously movable chick conveyor.

It is an object of the present invention to provide an apparatus for continuous high speed loading of chicks into handling trays wherein the diverter members are movable between the open and closed position by a pneumatic control means.

It is an object of the present invention to provide an apparatus for continuous high speed loading of chicks into handling trays wherein initial capital cost is minimal.

It is an object of the present invention to provide an apparatus for continuous high speed loading of chicks into handling trays wherein maintenance requirements are minimized.

It is an object of the present invention to provide an apparatus for continuous high speed loading of chicks into handling trays wherein down time is minimized.

It is an object of the present invention to provide an apparatus for continuous high speed loading of chicks into handling trays wherein chicks do not have to be held in a hopper or some other holding apparatus while the empty boxes are moving into the chick receiving position.

It is an object of the present invention to provide an apparatus for continuous high speed loading of chicks into handling trays wherein bottlenecks in loading of chicks into handling trays are prevented.

It is an object of the present invention to provide an apparatus for continuous high speed loading of chicks into handling trays wherein chicks are continuously loaded into handling trays rather than being loaded with a full box capacity simultaneously as with most prior art devices.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
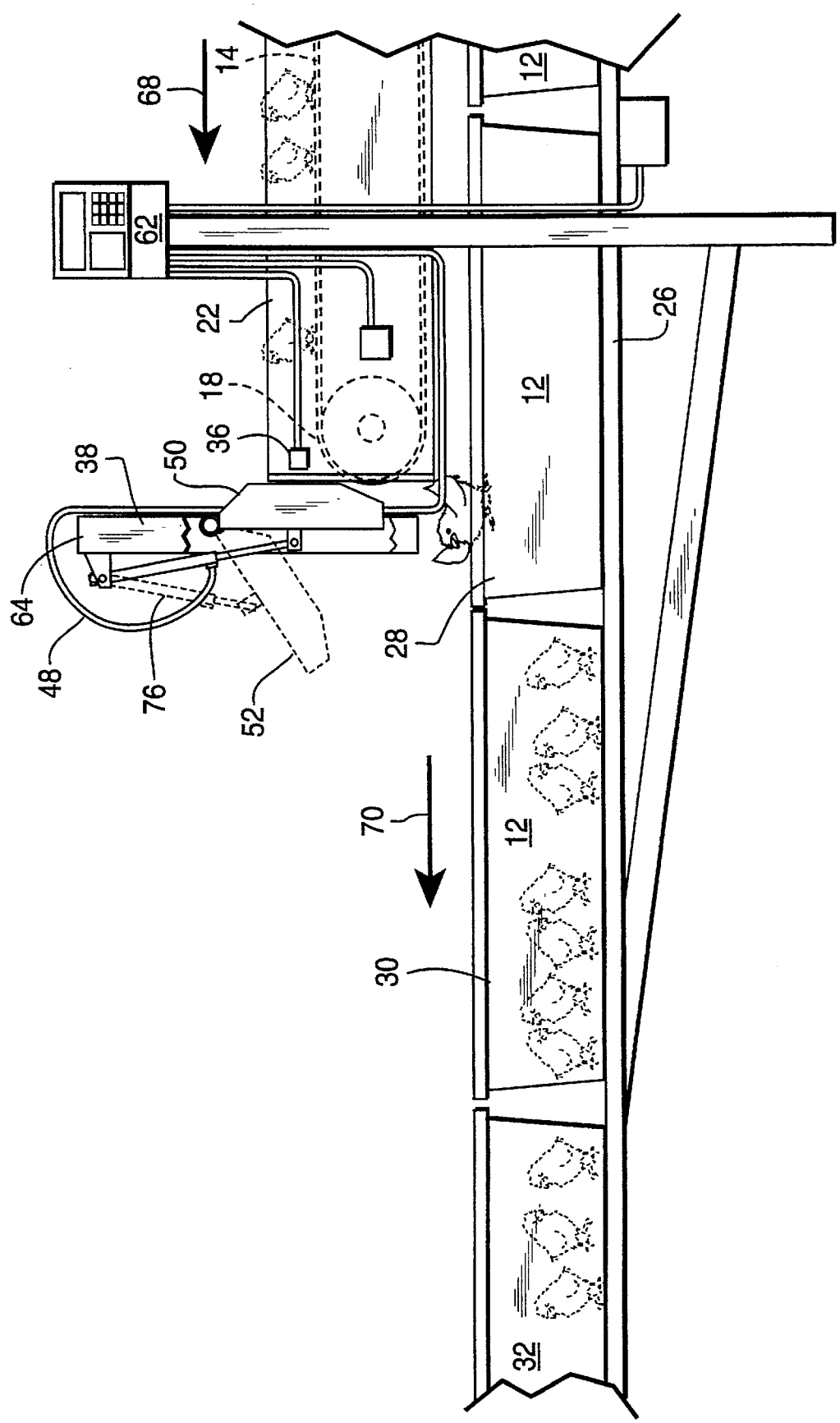
FIG. 1 is a side plan view of an embodiment of the apparatus of the present invention for continuous high speed loading of chicks into handling trays.

The present invention provides an apparatus for continuous high speed loading of chicks 10 into a plurality of handling trays 12. The chicks 10 are carried upon a chick conveyor 14.

Chick conveyor 14 includes an input end 16 and an output end 18. Chicks 10 are fed onto the chick conveyor 14 at any convenient point between the input end 16 and the output end 18 thereof. The direction of movement of the chick conveyor 14 is shown by directional arrow 68 with movement of chicks 10 being generally from the input end 16 toward the output end 18. At the output end 18 the chicks are designed to exit as shown by exiting chicks 20 for movement downwardly onto handling trays positioned therebelow.

Figure 2:
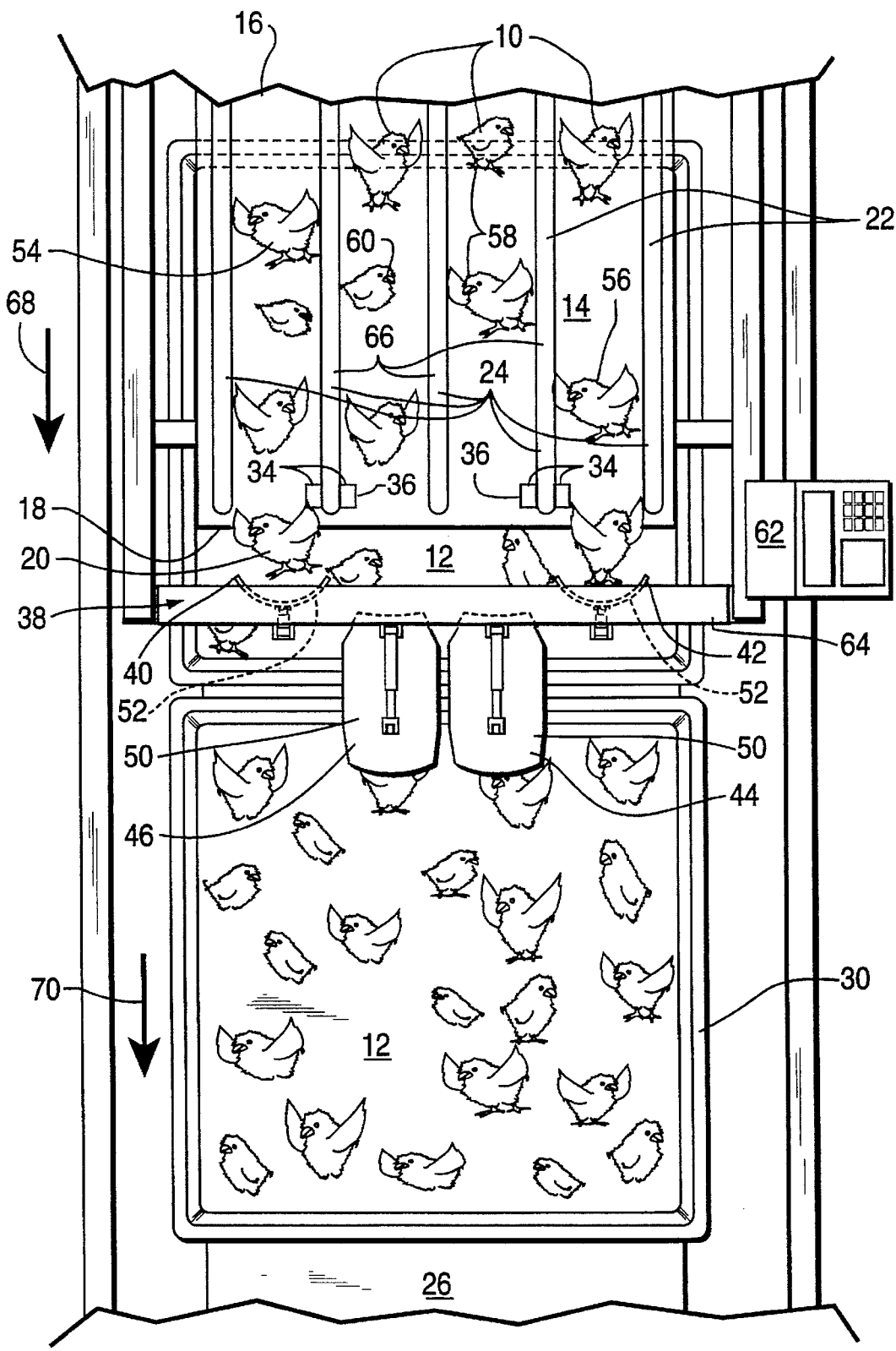
FIG. 2 is a top plan view of the embodiment shown in FIG. 1.

While traveling upon the chick conveyor 14, preferably, the chicks 10 are divided by a divider means 22 including a plurality of divider walls 24 designed to divide the chicks 10 into a plurality of rows of chicks. In the preferred embodiment the divider walls 24 will divide the chicks into four individual rows shown best on FIG. 2 as first chick row 54, second chick row 56, third chick row 58 and fourth chick row 60. The first row of chicks 54 and the second row of chicks 56 will be positioned preferably on the outermost lateral edges of the conveyor.

In this manner chicks 10 will be continuously supplied by the chick conveyor 14 at the output end 18 thereof in four given rows, 54, 56, 58 and 60, respectively.

A tray conveyor 26 will preferably be positioned below the chick conveyor 14 and will be capable of movement in the tray conveyor movement direction shown by arrow 70 which is preferably parallel to the movement direction of chick conveyor 14 and therebelow. Tray conveyor 26 will define a first tray position 28 shown in FIG. 1 to be immediately below the output end 18 of the chick conveyor 14 and a second tray position 30 positioned immediately downstream from first tray position 28 and at a location downwardly and slightly outwardly from the output end 18 of chick conveyor 14.

In operation the tray conveyor apparatus 26 will be periodically operable to move the trays forward one tray position. As shown in FIG. 1, the first tray position 28 is positioned immediately upstream of the second tray position 30 which itself is positioned immediately upstream from the exiting tray 32. An empty tray is partially shown to the right of first tray position 28 in FIG. 1. During movement of the trays, an empty tray will move to the left as shown in FIG. 1 to the first tray position 28. The partially filled handling tray 12, formerly in the first tray position 28, will move to the left into the second tray position 30. The filled handling tray 12, formerly in the second tray position 30, will move to the left and will become the exiting tray 32. Once all of the trays have moved downstream on the tray conveyor 26 to the new location, movement of all of the trays will cease.

Figure 3:
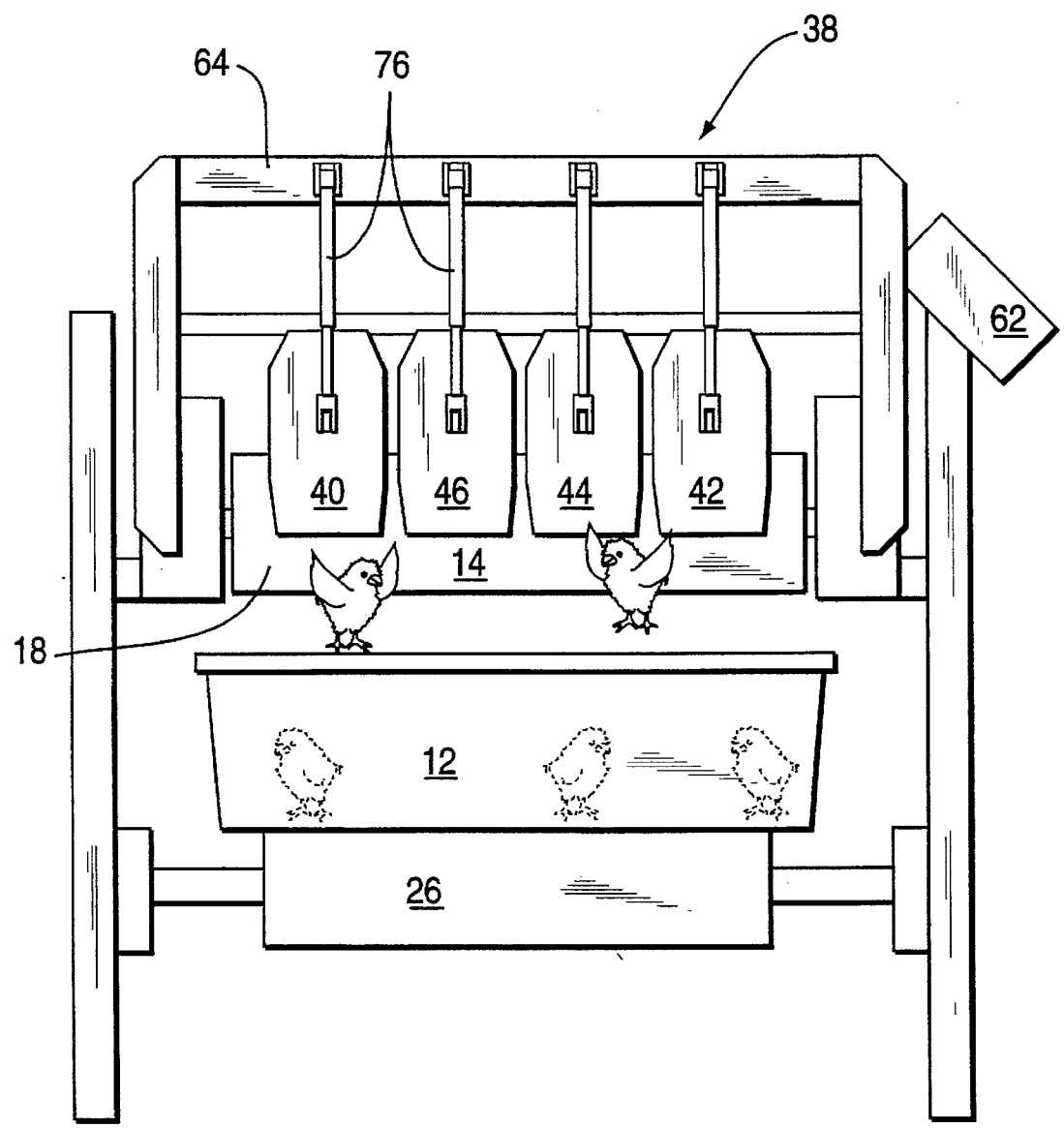
FIG. 3 is a side plan view of the embodiment shown in FIG. 1.

The tray conveyor apparatus 26 can be configured in numerous different configurations with two such constructions being currently contemplated. In one design the tray conveyor 26 is continuously operable at all times with stopping members selectively movable adjacent the edge of each tray at the first tray position 28 and the second tray position 30 to retain trays in these positions as described herein. In this embodiment the tray conveyor 26 itself will continuously rotate with the stopping members or arms holding the tray stationary in their respective positions and the tray conveyor skidding along the undersurface thereof. When movement of the trays to the next position is required the stopping members will retract to allow the trays to move downstream one station and then return as the next trays approach the first and second tray stations 28 and 30. In a second design as shown in the FIGS. 1 to 3 herein, the tray conveyor apparatus 26 can simply comprise a sequentially movable conveyor being selectively movable. In both above described configuration, the composite tray conveyor apparatus is movable and causes sequential movement of all of the trays from the first tray position 28 to the second tray position 30 and on to exiting thereof. Thus, the different configurations of the tray conveyor apparatus are functionally equivalent.

It is primary object of this preferred embodiment to fill each tray to an accurate count of full capacity while allowing continuous filling of trays at all times. This design does not utilize any batch loading but utilizes the much more gentle and less damaging aspect of loading from a continuously moving chick supply conveyor. For this configuration the chick conveyor 14 is continuously moving whereas the tray conveyor apparatus 26 only moves the receiving trays periodically and yet continuous loading is made possible by the diverter assembly 38.

Diverter assembly 38 includes a plurality of individual diverter members and in this preferred embodiment includes first diverter member 40, second diverter member 42, third diverter member 44 and fourth diverter member 46. These four diverter members are each pivotally movable with respect to the diverter support bar 64. This pivotal movability allows each of the diverters 4 through 46 to be movable between a closed diverter position 50 and an open diverter position 52. In closed diverter position 50 the diverter member is oriented downwardly for guiding movement of chicks 10 into a handling tray 12 located at the first tray position 28. When in the open diverter position 52 the diverter member 48, 42, 44 or 46 is oriented extending downwardly and outwardly in a direction away from the chick conveyor 14 as shown best in FIG. 1 to facilitate guiding of movement of chicks into the handling tray 12 positioned at the second tray position 30.

A chick counter means 34 which preferably includes a photoelectric sensing means 36 is preferably positioned adjacent to any possible path of movement of a chick 10 on the chick conveyor 14 and is preferably positioned within each row of chicks defined thereon. This counter means is designed to provide an accurate count of the number of chicks which have been loaded within a handling tray 12 positioned at either the first tray position 28 or the second tray position 30.

In the preferred embodiment shown in this design a pneumatic hose means 48 will be operatively secured with respect to a pneumatic piston means 76 in order to control movement of the individual diverters 42, 44 and 46 between the open and closed diverter positions 52 and 50 respectively. Also preferably the divider member includes three divider walls 66 which are operative to divide the chicks moving upon the chick conveyor 14 into four specific rows of chicks set forth as first through fourth chick rows 54, 56, 58 and 60 respectively. Also to facilitate guiding of movement of the chicks gently each of the diverters 40, 42, 44 and 46 is preferably formed with arcuate shapes to minimize the possibility of damaging of the chicks and to aid in gentle guiding thereof into the respective trays in the first and second tray positions 28 and 30 located on the tray conveyor 26.

In operation the design of the present invention is that all of the chicks traveling on the chick conveyor 14 in all of the rows of chicks will be loaded into the handling tray 12 positioned at the second tray position 30 initially. That is, as the tray 30 is filled to 20, 30, 40, 50, 60, 70 and 80 percent capacity all four of the diverters 40 through 46 would be in the open diverter position 52 as shown in FIG. 1. A controller means 62 will be operatively connected with respect to the pneumatic cylinders associated with each of the four diverter members 40 through 46 and will also be operatively secured with respect to the photoelectric chick counter means 34. Controller 62 will also be operatively connected with respect to the tray conveyor apparatus 26 for controlling movement of trays thereupon.

In operation the controller 62 will sense when the handling tray 12 at the second tray position 30 has reached the 90% capacity fill condition. Once the 90% capacity of fill is reached, the first diverter member 40 will be pivotally moved from the open diverter position 52 to the closed diverter position 50. At this point all chicks within the first row of chicks 54 will start loading of the empty handling tray 12 currently positioned in the first tray position 28. At this point the second, third and fourth diverters 42 through 46 will continue to allow all chicks traveling in the second row 56, third row 58 and fourth row 60 to move into the handling tray 12 in the second tray position 30. Thus, filling of this tray will continue but at a slower pace than prior to movement of the first diverter member 40 from the open diverter position 52 to the closed diverter position 50.

The controller means 62 will continue to monitor the photoelectric chick counter 34 and once the loading of handling tray 12 in second tray position 30 reaches 95% capacity controller means 62 will cause movement of the second diverter member 42 from the open diverter position 52 to the closed diverter position 50. Thus, all chicks in the second row of chicks 56 will now be diverted to loading of the handling tray 12 in the first tray position 28. Thus, the rate of loading of chicks 10 into the handling tray 12 positioned in the second tray position 30 will be further decreased since once it is 95% full that tray will only be receiving chicks from the third and fourth rows 58 and 60 respectively.

The controller means 62 will further continue to monitor the loading of chicks into handling tray 12 in the second tray position 30 and once the number of chicks reaches 98% of total capacity the controller 62 will move the third diverter member 44 from the open diverter position 52 to the closed diverter position 50. At this point all chicks traveling in the first, second and third rows 54, 56 and 58, respectively, will be counted and continuously moved into the handling tray 12 positioned in the first tray position 28. Also at the same time the handling tray 12 in the second tray position 30 will be at the 98% filled capacity and will be receiving chicks only from the fourth row 60 of chicks 10.

Once the controller 62 senses that the count number of chicks in the handling tray 12 in the second tray position 30 has reached 100% capacity, it will initiate movement of the fourth diverter member 46 from the open diverter position 52 to the closed diverter position 50. At this point the handling tray 12 at second position 30 will be completely filled. Once all of the diverters 40 through 46 are in the closed position, the controller 62 will initiate operation of the tray conveyor apparatus 26 thereby moving all of the handling trays 12 on the tray conveyor 26 downstream one step. Thus, the filled handling tray 12 in the second tray position 30 will exit and become an exiting tray 32. The handling tray 12 in the first tray position 28 will move from the first tray position 28 to the second tray position 30 and an empty tray will be moved to the first tray position 28.

Simultaneously with movement or the receiving trays downstream one station, the controller 62 will initiate movement of all four diverter members 40 through 46 respectively from the closed diverter position 50 to the open diverter position 52. The timing of this movement is preferably oriented to coincide with the time of movement of handling tray 12 from the first tray position 28 to the second tray position 30. In this manner the chicks from all four rows of chicks 54 through 60 will be guided by the four diverters 40 through 46 into the tray as it moves from the first tray position 28 to the second tray position 30. In other words, the diverters 40 through 46 will actually "follow" the tray as it moves from first tray station 28 to second tray station 30 in order to continuously fill that tray. With the partially filled tray arriving in the second tray position 30 and the diverter members 40 through 46 all moving to the open diverter position 52, the cycle has been completed and all four diverters will remain in the open diverter position 52 until the controller receives information from the photoelectric counter 34 that this tray has reached 90% capacity at which time the first diverter 40 will move to the closed diverter position 50 and the cycle will begin again.

In this manner a continuous supply of chicks can be supplied on a chick supplying conveyor and be continuously loaded into handling trays which are moved periodically and advanced one step each time a tray is loaded to full capacity. Thus, the system of the present invention avoids batch loading of chicks into trays a hundred at a time which can damage chicks and also increase the amount of time needed for loading and significantly decrease the capacity of the automatic loading apparatus of the design. It should be appreciated that the percentages of capacity at which the diverters move from the closed diverter position 50 to the open diverter position 52 can be adjusted as needed depending on the rate of chick supply and other operating conditions. Also note that it is preferable that the rows of chicks which tend to have the greater supply of chicks be the chosen rows that continuously fill a box to 100% capacity in order to increase the operating capacity of the system.

In the present embodiment it can be seen that the center two rows tend to have more chicks located therein than the outer two rows and for this reason the center two rows are the last two moved from the open diverter position 52 to the closed diverter position 50 to increase the speed of operation and enable the last few chicks for loading to full capacity to be done as quickly as possible.

It should be appreciated that the design of the present invention can be performed utilizing different percentages for different sizes or capacities of operation. Also the number of diverters and chick rows can be of any number. Preferably, the number of chick supplying rows will be three or four in number. Also, the apparatus of the present invention can be positioned adjacent apparatus of similar or identical configuration thereby multiplying the capacity of the overall configuration. For example, two adjacent identical continuously loading systems have been found to be particularly effective with three chick supplying rows each.

It is only preferred that the individual rows be gradually shifted from movement into the almost full tray to the more empty tray as the sensed percentage full in the chick tray at the second station is sensed. Any number of actual rows of chicks and diverter members can be utilized in order to further fine tune the system based upon the capacity of the handling trays and the number of chicks being supplied.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for continuous high speed loading of chicks into handling trays comprising:

A. a chick conveyor means for transporting chicks thereon, said chick conveyor means including:
      (1) an input end;
      (2) an output end with said chick conveyor means traveling from said input end toward said output end for urging the chicks carried thereon to exit from said chick conveyor means adjacent said output end thereof;
   B. a divider means positioned above said chick conveyor means and including a plurality of divider walls to separate chicks being transported thereon into a plurality of rows of chicks traveling thereon;
   C. a tray conveyor means traveling below said chick conveyor means and adapted to transport handling trays to a location approximately below said output end of said chick conveyor means to receive chicks exiting therefrom, said tray conveyor means defining a first tray position and a second tray position thereon, said tray conveyor means being operative to move each handling tray thereon initially to said first tray position for initial filling thereof and to thereafter move the handling tray to said second tray position for filling thereof to full capacity and to remove the handling tray from the loading apparatus for exiting therefrom;
   D. a chick counter means positioned adjacent said chick conveyor means to count the number of chicks passing therealong into a handling tray positioned upon said tray conveyor means therebelow;
   E. a diverter assembly means positioned adjacent said output end of said chick conveyor means to control the movement of chicks from said chick conveyor means into the handling trays positioned on said tray conveyor means therebelow at said first tray position and said second tray position, said diverter assembly means including a plurality of diverter members positioned adjacent said output end of said chick conveyor for controlling movement of chicks exiting therefrom, each one of said diverter members being positioned adjacent one associated row of chicks exiting from said chick conveyor means to facilitate control of movement thereof into the handling trays therebelow, each of said diverter members being selectively pivotally movable to a closed diverter position for deflecting chicks exiting said chick conveyor means from the associated row of chicks into a handling tray positioned on said tray conveyor means at said first tray position therebelow, each of said diverter members also being selectively pivotally movable to an open diverter position for deflecting chicks exiting said chick conveyor means from the associated row of chicks into a handling tray positioned on said tray conveyor means at said second tray position therebelow; and
   F. a controller means operatively secured to said diverter assembly means for controlling pivotal movement of said diverter members between the open and the closed position thereof and operatively secured to said chick counter means to determine the number of chicks having been loaded into each handling tray on said tray conveyor means, said controller means also being operatively secured to said tray conveyor means to cause periodic movement of each handling tray carried thereon to said first tray position, said second tray position and for exiting thereof, said controller means being responsive to the handling tray located in said second tray position being filled with chicks to full capacity to move all of said diverter members to the closed diverter position for loading of chicks in the handling tray located in said first tray position.

2. An apparatus for continuous high speed loading of chicks into handling trays as defined in claim 1 wherein said controller means is responsive to movement of all said diverter members to the closed diverter position to initiate movement of the filled handling tray to exit from said second tray position and to move the handling tray currently being filled from said first tray position to said second tray position and to move an empty handling tray into said first tray position.

3. An apparatus for continuous high speed loading of chicks into handling trays as defined in claim 2 wherein said controller means is responsive to the initiation of movement of a partially filled handling tray from said first tray position to said second tray position to initiate movement of all of said diverter members from said closed diverter position to said open diverter position.

4. An apparatus for continuous high speed loading of chicks into handling trays as defined in claim 3 wherein said controller means is operative to move said diverter members from said closed diverter position to said open diverter position simultaneously with movement of a handling tray being filled from said first tray position to said second tray position to allow continuous filling thereof with chicks during movement thereof.

5. An apparatus for continuous high speed loading of chicks into handling trays as defined in claim 1 wherein said controller means is responsive to sequentially move said diverter members from said open position to said closed position responsive to filling of the handling tray positioned at said second tray position to a given percentage of full capacity thereof.

6. An apparatus for continuous high speed loading of chicks into handling trays as defined in claim 1 wherein said controller means is responsive to sequentially move said diverter members one at a time from said open position to said closed position responsive to filling of the handling tray to increasingly larger given percentages of full capacity thereof.

7. An apparatus for continuous high speed loading of chicks into handling trays as defined in claim 1 wherein said divider means includes at least three divider walls to separate chicks traveling upon said chick conveyor means into a first chick row, a second chick row, a third chick row and a fourth chick row thereof and wherein said diverter assembly means includes:

A. a first diverter member positioned adjacent said output end of said chick conveyor means adjacent the first row of chicks for controlling movement of chicks therein downwardly into handling trays positioned at said first tray position and said second tray position of said tray conveyor means therebelow;

B. a second diverter member positioned adjacent said output end of said chick conveyor means adjacent the second row of chicks for controlling movement of chicks therein downwardly into handling trays positioned at said first tray position and said second tray position of said tray conveyor means therebelow;

C. a third diverter member positioned adjacent said output end of said chick conveyor means adjacent the third row of chicks for controlling movement of chicks therein downwardly into handling trays positioned at said first tray position and said second tray position of said tray conveyor means therebelow; and D. a fourth diverter member positioned adjacent said output end of said chick conveyor means adjacent the fourth row of chicks for controlling movement of chicks therein downwardly into handling trays positioned at said first tray position and said second tray position of said tray conveyor means therebelow.

8. An apparatus for continuous high speed loading of chicks into handling trays as defined in claim 7 wherein said first diverter member is operative to move from said open diverter position to said closed diverter position responsive to the loading of chicks into the tray located at said second tray position reaching 90% of full capacity thereof to initiate loading of the handling tray located at said first tray position on said tray conveyor means.

9. An apparatus for continuous high speed loading of chicks into handling trays as defined in claim 8 wherein said second diverter member is operative to move from said open diverter position to said closed diverter position responsive to the loading of chicks into the tray located at said second tray position reaching approximately 95% of full capacity thereof to facilitate further loading of the handling tray located at said first tray position on said tray conveyor means.

10. An apparatus for continuous high speed loading of chicks into handling trays as defined in claim 9 wherein said third diverter member is operative to move from said open diverter position to said closed diverter position responsive to the loading of chicks into the tray located at said second tray position reaching approximately 98% of full capacity thereof to facilitate further loading of the handling tray located at said first tray position on said tray conveyor means.

11. An apparatus for continuous high speed loading of chicks into handling trays as defined in claim 10 wherein said fourth diverter member is operative to move from said open diverter position to said closed diverter position responsive to the loading of chicks into the tray located at said second tray position reaching full capacity thereof to prevent overfilling thereof and to facilitate further loading of the handling tray located at said first tray position on said tray conveyor means.

12. An apparatus for continuous high speed loading of chicks into handling trays as defined in claim 11 wherein said four diverter members are positioned adjacent to one another with said third and fourth diverter members positioned adjacent to one another at a position between said first and second diverter members.

13. An apparatus for continuous high speed loading of chicks into handling trays as defined in claim 1 wherein said chick counter means include photocell means to facilitate counting of chicks passing thereadjacent.

14. An apparatus for continuous high speed loading of chicks into handling trays as defined in claim 13 wherein said photocell means includes a plurality of photocell members positioned adjacent each row of chicks to facilitate counting thereof.

15. An apparatus for continuous high speed loading of chicks into handling trays as defined in claim 1 wherein said diverter assembly means is pneumatically powered for moving said diverter members pivotally between said closed diverter position and said open diverter position.

16. An apparatus for continuous high speed loading of chicks into handling trays as defined in claim 1 wherein said diverter members are arcuate to facilitate guiding of chicks unharmed into the handling trays located therebelow.

17. An apparatus for continuous high speed loading of chicks into handling trays as defined in claim 1 wherein said diverter members extend generally downwardly when in the closed position and extend generally downwardly and outwardly away from said chick conveyor means when in the open position.

18. An apparatus for continuous high speed loading of chicks into handling trays as defined in claim 1 wherein said tray conveyor means is operative to travel in the same direction and parallel to said chick conveyor means and therebelow.

19. An apparatus for continuous high speed loading of chicks into handling trays comprising:
  A. a chick conveyor means for transporting chicks thereon, said chick conveyor means including:
    (1) an input end;
    (2) an output end with said chick conveyor means traveling from said input end toward said output end for urging the chicks carried thereon to exit from said chick conveyor means adjacent said output end thereof;
  B. a divider means positioned above said chick conveyor means and including a plurality of divider walls to separate chicks being transported thereon into a plurality of rows of chicks traveling thereon;
  C. a tray conveyor means traveling below said chick conveyor means and adapted to transport handling trays to a location approximately below said output end of said chick conveyor means to receive chicks exiting therefrom, said tray conveyor means defining a first tray position and a second tray position thereon, said tray conveyor means being operative to move each handling tray thereon initially to said first tray position for initial filling thereof and to thereafter move the handling tray to said second tray position for filling thereof to full capacity and to finally remove the handling tray from the loading apparatus for exiting therefrom;
  D. a chick counter means positioned adjacent said chick conveyor means to count the number of chicks passing therealong into a handling tray positioned upon said tray conveyor means therebelow;
  E. a diverter assembly means positioned adjacent said output end of said chick conveyor means to control the movement of chicks from said chick conveyor means into the handling trays positioned on said tray conveyor means therebelow at said first tray position and said second tray position, said diverter assembly means including a plurality of diverter members positioned adjacent said output end of said chick conveyor for controlling movement of chicks exiting therefrom, each one of said diverter members being positioned adjacent one associated row of chicks exiting from said chick conveyor means to facilitate control of movement thereof into the handling trays therebelow, each of said diverter members being selectively pivotally movable to a closed diverter position for deflecting chicks exiting said chick conveyor means from the associated row of chicks into a handling tray positioned on said tray conveyor means at said first tray position therebelow, each of said diverter members also being selectively pivotally movable to an open diverter position for deflecting chicks exiting said chick conveyor means from the associated row of chicks into a handling tray positioned on said tray conveyor means at said second tray position therebelow; and
  F. a controller means operatively secured to said diverter assembly means for controlling pivotal movement of said diverter members between the open and the closed position thereof and operatively secured to said chick counter means to determine the number of chicks having been loaded into each handling tray on said tray conveyor means, said controller means also being operatively secured to said tray conveyor means to cause periodic movement of each handling tray carried thereon to said first tray position, said second tray position and for exiting thereof, said controller means being responsive to sequentially move said diverter members one at a time from said open position to said closed position responsive to filling of the handling tray to increasingly larger percentages of full capacity thereof, said controller means being responsive to the handling tray located in said second tray position being filled with chicks to full capacity to move all of said diverter members to the closed diverter position for loading of chicks in the handling tray located in said first tray position, said controller means being responsive to movement of all said diverter members to the closed diverter position to initiate movement of the filled handling tray to exit from said second tray position and to move the handling tray being filled from said first tray position to said second tray position and to move an empty handling tray into said first tray position, said controller means being responsive to the initiation of movement of a partially filled handling tray from said first tray position to said second tray position to initiate movement of all of said diverter members from said closed diverter position to said open diverter position, said controller means being operative to move said diverter members from said closed diverter position to said open diverter position simultaneously with movement of a handling tray being filled from said first tray position to said second tray position to allow continuous filling thereof with chicks during movement thereof resulting from selective operation of said tray conveyor means, said controller means being responsive to sequentially move said diverter members from said open position to said closed position responsive to filling of the handling tray positioned at said second tray position to a given percentage of full capacity thereof.

20. An apparatus for continuous high speed loading of chicks into handling trays comprising:
  A. a chick conveyor means for transporting chicks thereon, said chick conveyor means including:
    (1) an input end;
    (2) an output end with said chick conveyor means traveling from said input end toward said output end for urging the chicks carried thereon to exit from said chick conveyor means adjacent said output end thereof;
  B. a divider means positioned above said chick conveyor means and including a plurality of divider walls to separate chicks being transported thereon into a first row of chicks, a second row of chicks, a third row of chicks and a fourth row of chicks being carried thereon;
  C. a tray conveyor means traveling in the same direction parallel to and below said chick conveyor means and adapted to transport handling trays to a location approximately below said output end of said chick conveyor means to receive chicks exiting therefrom, said tray conveyor means defining a first tray position and a second tray position thereon, said tray conveyor means being operative to move each handling tray thereon initially to said first tray position for initial filling thereof and to thereafter move the handling tray to said second tray position for filling thereof to full capacity and to finally remove the handling tray from the loading apparatus for exiting therefrom;

D. a chick counter means positioned adjacent each row of chicks being carried upon said chick conveyor means to count the number of chicks passing therealong into a handling tray positioned upon said tray conveyor means therebelow, said chick counter means including a photocell means to facilitate counting of chicks moving into the handling trays therebelow;

E. a diverter assembly means positioned adjacent said output end of said chick conveyor means to control the movement of chicks from said chick conveyor means into the handling trays positioned on said tray conveyor means therebelow at said first tray position and said second tray position, said diverter assembly means including a plurality of diverter members each being arcuate in shape and positioned adjacent said output end of said chick conveyor for controlling movement of chicks exiting therefrom, each one of said diverter members being positioned adjacent one associated row of chicks exiting from said chick conveyor means to facilitate control of movement thereof into the handling trays therebelow, each of said diverter members being selectively pivotally movable to a closed diverter position extending generally downwardly for deflecting chicks exiting said chick conveyor means from the associated row of chicks into a handling tray positioned on said tray conveyor means at said first tray position therebelow, each of said diverter members also being selectively pivotally movable to an open diverter position extending generally downwardly and outwardly from said chick conveyor means for deflecting chicks exiting said chick conveyor means from the associated row of chicks into a handling tray positioned on said tray conveyor means at said second tray position therebelow, said diverter assembly means including:

(1) a first diverter member positioned adjacent said output end of said chick conveyor means adjacent the first row of chicks for controlling movement of chicks therein downwardly into handling trays positioned at said first tray position and said second tray position of said tray conveyor means therebelow, said first row of chicks and said first diverter member being positioned on one lateral side of said chick conveyor means;

(2) a second diverter member positioned adjacent said output end of said chick conveyor means adjacent the second row of chicks for controlling movement of chicks therein downwardly into handling trays positioned at said first tray position and said second tray position of said tray conveyor means therebelow, said second row of chicks and said second diverter member being positioned on a lateral side of said chick conveyor means opposite from said first row of chicks and said first diverter member;

(3) a third diverter member positioned adjacent said output end of said chick conveyor means adjacent the third row of chicks for controlling movement of chicks therein downwardly into handling trays positioned at said first tray position and said second tray position of said tray conveyor means therebelow, said third row of chicks and said third diverter member being positioned laterally between said first row of chicks and second row of chicks on said chick conveyor means;

(4) a fourth diverter member positioned adjacent said output end of said chick conveyor means adjacent the fourth row of chicks for controlling movement of chicks therein downwardly into handling trays positioned at said first tray position and said second tray position of said tray conveyor means therebelow, said fourth row of chicks and said fourth diverter member being positioned laterally between said first row of chicks and second row of chicks on said chick conveyor means; and a controller means operatively secured to said diverter assembly means for controlling pivotal movement of said diverter members between the open and the closed position thereof and operatively secured to said chick counter means to determine the number of chicks having been loaded into each handling tray on said tray conveyor means, said controller means also being operatively secured to said tray conveyor means to cause periodic sequential of each handling tray carried thereon to said first tray position, said second tray position and thereafter for exiting thereof, said controller means being responsive to the handling tray located in said second tray position being filled with chicks to full capacity to move all of said diverter members to the closed diverter position for loading of chicks in the handling tray located in said first tray position, said controller means being operative to urge movement of said first diverter member from said open diverter position to said closed diverter position responsive to the loading of chicks into the tray located at said second tray position reaching 90% of full capacity thereof, said controller means being operative to urge movement of said second diverter member from said open diverter position to said closed diverter position responsive to the loading of chicks into the tray located at said second tray position reaching 95% of full capacity thereof, said controller means being operative to urge movement of said third diverter member from said open diverter position to said closed diverter position responsive to the loading of chicks into the tray located at said second tray position reaching 98% of full capacity thereof, said controller means being operative to urge movement of said fourth diverter member from said open diverter position to said closed diverter position responsive to the loading of chicks into the tray located at said second tray position reaching 100% of full capacity thereof, said controller means including a pneumatic means operatively secured with respect to each of said diverter members for operatively controlling pivoting thereof between said open position and said closed position.

\* \* \* \* \*